United States Patent
Ledwith et al.

(10) Patent No.: US 9,998,849 B2
(45) Date of Patent: Jun. 12, 2018

(54) ADAPTABLE SCHEMA BASED PAYLOADS

(71) Applicant: APPLE INC., Cupertino, CA (US)

(72) Inventors: Alexander R. Ledwith, Cupertino, CA (US); Bob Bradley, San Jose, CA (US); Christopher C. Jensen, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 42 days.

(21) Appl. No.: 15/179,676

(22) Filed: Jun. 10, 2016

(65) Prior Publication Data
US 2017/0359676 A1    Dec. 14, 2017

(51) Int. Cl.
| | |
|---|---|
| H04W 4/00 | (2018.01) |
| H04L 5/00 | (2006.01) |
| H04W 4/20 | (2018.01) |
| H04L 29/06 | (2006.01) |
| H04W 28/18 | (2009.01) |
| H04W 4/06 | (2009.01) |
| H04W 76/02 | (2009.01) |

(52) U.S. Cl.
CPC ........... *H04W 4/008* (2013.01); *H04L 5/0044* (2013.01); *H04L 65/4076* (2013.01); *H04W 4/06* (2013.01); *H04W 28/18* (2013.01); *H04W 76/028* (2013.01); *H04W 4/206* (2013.01)

(58) Field of Classification Search
CPC ........ H04W 4/00; H04W 4/008; H04W 4/06; H04W 76/028; H04W 28/18; H04L 65/4076
See application file for complete search history.

(56) References Cited

U.S. PATENT DOCUMENTS

| | | | | |
|---|---|---|---|---|
| 2009/0222530 A1* | 9/2009 | Buford | ............... | H04L 12/185 709/217 |
| 2015/0007242 A1* | 1/2015 | Fay | ............... | H04N 21/236 725/116 |

(Continued)

FOREIGN PATENT DOCUMENTS

WO    WO 2015/062672    5/2015

*Primary Examiner* — Ankur Jain
*Assistant Examiner* — Zhitong Chen
(74) *Attorney, Agent, or Firm* — Invoke (57) ABSTRACT

An approach is provided for providing adaptable schema based payloads for state advertisement messages. In some implementations, multiple schemas (e.g., payload data and structure definition) can be used to flexibly and dynamically define advertisement message payloads. For example, the computing device can use advertising message to share and broadcast information between devices by using adaptable schema based payloads. The computing device can store schemas, receive service advertising data, and determine a schema for encoding service advertising data into an advertising message. The computing device can generate the advertising message, encode a schema identifier into the advertising message header, and encode device state data into the advertising message payload according to the determined schema. In some implementations, the computing device can receive advertising message, determine a schema based on a schema identifier in the message, and extract device state data from the advertising message according to the determined schema.

15 Claims, 5 Drawing Sheets

(56) References Cited

U.S. PATENT DOCUMENTS

| | | | |
|---|---|---|---|
| 2015/0172902 A1* | 6/2015 | Kasslin | H04L 45/745 370/328 |
| 2015/0364143 A1 | 12/2015 | Abildgren et al. | |
| 2016/0073220 A1 | 3/2016 | Wang et al. | |
| 2016/0128117 A1 | 5/2016 | Engelien-Lopes et al. | |
| 2016/0128126 A1 | 5/2016 | Engelien-Lopes et al. | |
| 2016/0142856 A1* | 5/2016 | Worrall | H04W 4/003 455/456.3 |

\* cited by examiner

ADAPTABLE SCHEMA BASED PAYLOADS

TECHNICAL FIELD

The disclosure generally relates to encoding data for transmission between devices.

BACKGROUND

Many service providers and device manufactures use advertising messages to share and broadcast information between devices. For example, a device can advertise the availability of certain services or state information by broadcasting a Bluetooth Low Energy (BTLE) message that indicates the current state of an application or service. However, BTLE messages are limited in size. With all of the services and state information shared between devices using BTLE, a static payload definition will not provide enough flexibility to handle all of the data that needs to be transmitted between devices. Moreover, if a static BTLE payload definition is used, payload space (e.g., bits) may be wasted when not used by a corresponding service or application data.

SUMMARY

An approach is provided for providing adaptable schema based payloads for state advertisement messages. In some implementations, multiple schemas (e.g., payload data and structure definition) can be used to flexibly and dynamically define advertisement message payloads. For example, the computing device can use advertising message to share and broadcast information between devices by using adaptable schema based payloads. The computing device can store schemas, receive service advertising data, and determine a schema for encoding service advertising data into an advertising message. The computing device can generate the advertising message, encode a schema identifier into the advertising message header, and encode device state data into the advertising message payload according to the determined schema. In some implementations, the computing device can receive advertising message, determine a schema based on a schema identifier in the message, and extract device state data from the advertising message according to the determined schema.

Particular implementations provide at least the following advantages. The payload structure for state advertising messages can be dynamically redefined to accommodate new services, applications, and device features without having to load new software or operating system on the device. By flexibly or dynamically defining state advertising message payloads, fewer bits of the advertising message are wasted; the limited space available for advertisement message can be used more efficiently. By flexibly or dynamically defining state advertising message payloads, more different types of service, application, and/or device state information can be supported.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Examples of a method, apparatus, and computer program for providing adaptable schema based payloads are disclosed below. In the following description, for the purposes of providing explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
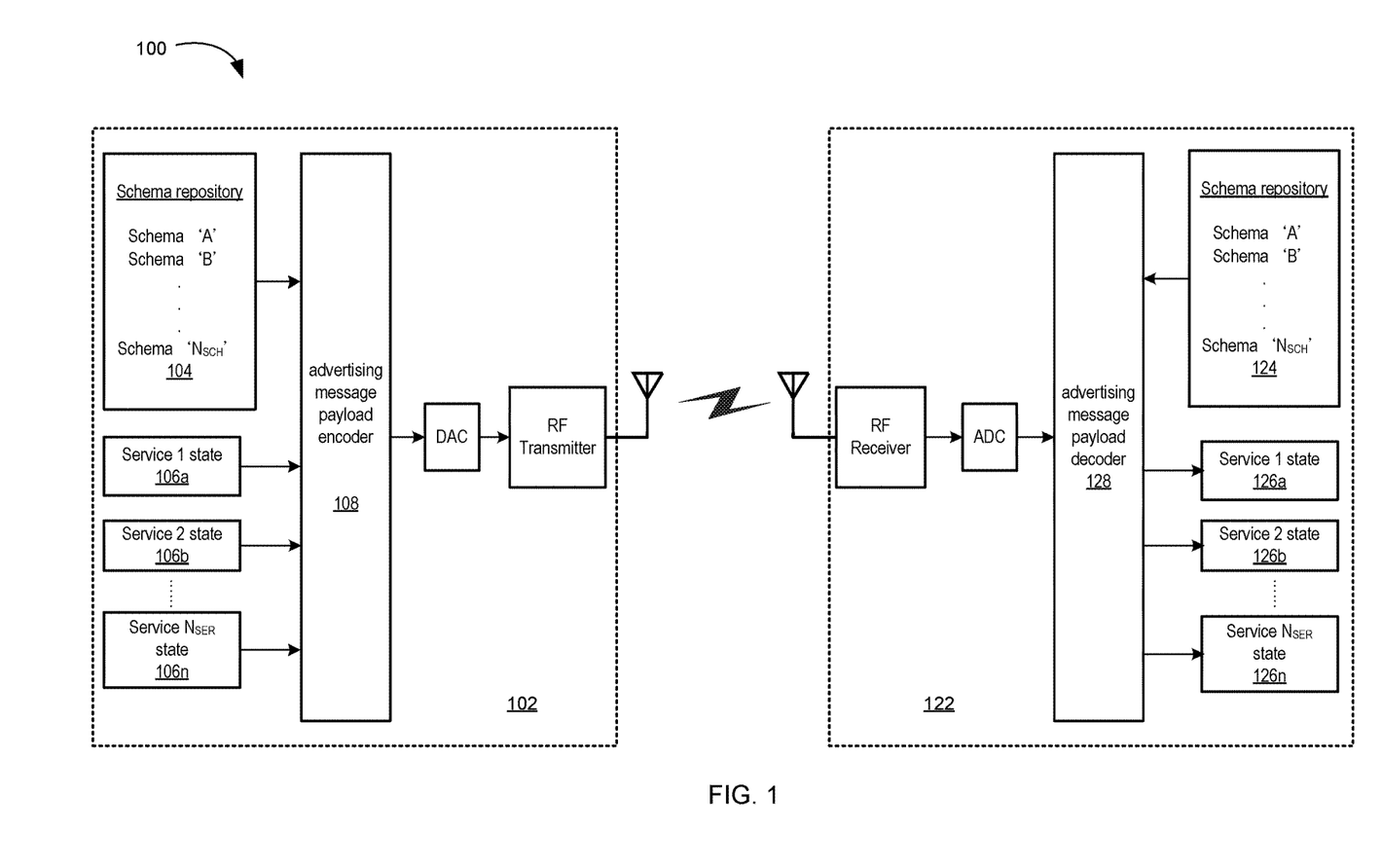
FIG. 1 is a block diagram of an example system 100 for providing adaptable schema based payloads for advertising messages.

FIG. 1 is a block diagram of an example system 100 for providing adaptable schema based payloads for advertising messages. In some implementations, system 100 can include user device 102 and/or user device 122. For example, user device 102 and 122 can be a computing device, such as a smartphone, tablet computer, television, desktop computer, laptop computer, household device, electronic book device, game device, streaming media device, set top box, automobile audio/video system, smart watch, smart glasses and/or other mobile or wearable device, the accessories and peripherals of these devices, or any combination thereof.

In some implementations, advertising messages can be used to coordinate services between different user devices or enable features on different user devices. For example, user device 102 and/or user device 122 can include various services (e.g., software applications, processes, operating system services, etc.) that provide a variety of services and features for the user of user device 102 and/or user device 122. These services can be configured to present media items (e.g., movies, music, videos, etc.) and/or present informative notifications to the user by generating audio, video, and/or haptic representations of data, as described further below. User device 102 and/or user device 122 can provide these services more intelligently when user device 102 and/or user device 122 have information about the current device state, current user activity, and/or services provided by other devices, such as user device 102 or user device 122.

As an example use case, a user may start using service on user device 102 and wish to continue using the service on user device 122. For example, a user may use a browser application on user device 102 (e.g., the user's desktop computer) to find a web page containing a recipe for bread. The user may wish to continue viewing the web page on user device 122 (e.g., a mobile device, smartphone, tablet computer, etc.) so that the user can take the recipe into the kitchen to bake the bread. To enable the transfer of the web browser state information (e.g., the current web page), user device 102 can broadcast a state advertisement message to user device 122 that indicates the user is using the browser application on user device 102 and is viewing the web page containing the recipe. For example, the state advertisement message can include an identifier for the browser application and/or the URL for the web page.

As another example, user device 102 and user device 122 can coordinate features or work to be performed by each device. For example, a user may have multiple devices (e.g., user device 102 and user device 122) that receive notifications to present to the user. It may be annoying to the user to have the notifications show up on several devices. For example, each device may produce a sound when the notification is received and it might be bothersome to the user to hear all of the notifications from different devices. It would be more useful for the devices to coordinate presentation of notifications so that the notifications were only presented by the device the user is currently using. Thus, user device 102 and user device 122 can use the state advertising messages described herein to share information about their respective user activity levels so that only the device currently being used by the user will present received notifications.

Other services may wish to advertise state information as well. For example, the operating system of user device 102 may wish to advertise its charging state to other devices (e.g., user device 122) so that the device the user is currently using (e.g., user device 122) can present a reminder to charge user device 102. User device 102 can use state advertising messages to advertise the need for a service. For example, if user device 102 is a streaming media device, user device 102 can advertise the need for a keyboard. User device 122 (e.g., a smartphone or tablet computer) can receive the advertisement and provide a keyboard that the user can use to provide textual input to user device 102. These services may be active at different times and so may or may not need to broadcast current state information. If the advertising message has a static definition where specific service state data is always represented by specific bits of data in the advertising message and the specific service is not active, then those bits corresponding to the service will be left unused and wasted when the advertising message is broadcasted. However, if the advertising message has a flexible definition (e.g., using the schemas described herein), then the unused bits in the advertising message can be reassigned to other active services, as described further below.

In some implementations, system 100 can use multiple schemas (e.g., payload data and structure definition) to flexibly and dynamically define state advertising messages. In some implementations, user device 102 can advertise that certain services (e.g., a file sharing service, web browser, video application, music application, notification coordination services, remote keyboard services, etc.) are active by broadcasting an advertising message that indicates the service is active. For example, a file transfer service on user device 102 can broadcast its availability to other user devices (e.g. user device 122) so that the user may transfer files from user device 122 to user device 102. A video application presenting a video on user device 122 can broadcast its current playback state information (e.g., an identifier for video being played, current playback position, etc.) so that the user can continue watching the video started on user device 122 on user device 102. A streaming media device can broadcast that a text input control has been selected and a keyboard is needed. Various user devices can broadcast their activity levels to coordinate presentation of notifications. When broadcasting the state advertising messages, user device 102 and/or user device 122 can select a schema that defines the structure of an advertising message payload based on what state information and/or what service is going to be advertised.

In some implementations, schemas can be selected based on security features and/or requirements. For example, a schema can be defined that specifies four bytes for encoding an authentication tag (e.g., a cryptographic hash value) or a nonce into an advertising message so that message sending devices can be authenticated by message receiving devices. Later, when stronger authentication is needed, another schema can be defined that specifies six bytes of data for encoding an authentication tag (e.g., a cryptographic hash value) or a nonce into an advertising message. This improvement in authentication strength can be implemented by simply storing a new schema that defines six bytes for the authentication data (e.g., tag, nonce, etc.) instead of four bytes.

In some implementations, the user device 102 can store multiple schemas (Schema 'A', 'B' . . . '$N_{SCH}$') corresponding to state information 106a-106n for Service 1, Service 2, . . . Service $N_{SER}$ in the schema repository 104. For example, state information 106 can correspond to state information for various services (e.g., applications, utilities, daemons, and/or operating system services) running on user device 102. For example, Service 1 can correspond to the virtual keyboard service described above. Service 2 can, for example, correspond to the notification coordination service described above.

In some implementations, advertising message encoder 108 can receive state advertising data from various processes on user device 102 and determine a schema for encoding state advertising data into a state advertising message. For example, encoder 108 can select a schema based on the received state advertising data and/or which services generated the state advertising data and/or sent the state advertising data to encoder 108.

In some implementations, schema repository 104 can include multiple different schemas for various combinations of state advertising data. For example, schema "A" can be mapped to "services group A" associated with service 1, service 2 and service 3. Schema "B" can be mapped to "service group B" associated with service 1 and service 3. To find the appropriate schema for the advertising processes or services, each schema in schema repository 104 can, for example, be mapped to a hash value that can be used as an index for finding the corresponding schema. In some implementations, the hash value can be generated based on service identifiers. For example, if schema "A" defines the state advertising message structure for advertising state information for service 1 (e.g., service identifier S1), service 2 (e.g., service identifier S2), and service 3 (e.g., service identifier S3), then the service identifiers S1, S2, and S3 can be provided as input to a hashing algorithm to generate a hash value to be used as an index for looking up the corresponding schema A. Thus, when state advertising message encoder 108 receives state information (e.g., including service identifiers) from service 1, service 2 and service 3 (or any other combination of services), encoder 108 can generate a hash value based on the service identifiers in the received state information and use the generated hash value as an index to lookup or determine the appropriate schema (e.g., schema A) for advertising the service state information in the schema mapping stored in schema repository 104.

In some implementations, state advertising message encoder 108 can generate a state advertising message based on the determined schema. For example, encoder 108 can encode the schema identifier into the advertising message. For example, the advertising message can be a Bluetooth (e.g., Bluetooth Low Energy) advertising message that includes a header section and payload section. Encoder 108 can encode a schema identifier (e.g., "A", or the corresponding hash value) corresponding to the schema associated with the advertising services into the advertising message (e.g., into the header section), as described above. Encoder 108 can determine the structure of the payload section of the advertising message based on the structure defined by the determined schema. For example, if the payload section includes 32 bits, the schema can define that the first ten bits are for service 1 data, the second ten bits are for service 2 data, and the last 12 bits are for service 3 data. Encoder 108 can then encode the service advertising data for the Service 1, Service 2, and Service 3 into the appropriate bits of the advertising message payload as defined by the determined schema.

In some implementations, user device 102 can broadcast the generated advertising message. For example, user device 102 can broadcast the generated advertising message using a wireless transmitter using to a wireless (e.g., peer-to-peer) technology, such as Bluetooth, Bluetooth Low Energy, peer-to-peer Wi-Fi, or some other wireless technology. The message can be broadcasted without selecting a specific recipient device. For example, any device (e.g., user device 122) within range of the wireless signal transmitted by user device 102 can receive and/or process the advertising message generated by user device 102. For example, user devices associated with a user account (e.g., a subscriber account, cloud service account, etc.) can receive and decode messages from other devices associated with the same user account. In some implementations, advertising messages can be received and decoded irrespective of user accounts or device types. For example, a device can receive and decode an advertising message even if the device is not associated with the same user as user device 102. A device can receive and decode an advertising message even if the device does not have the same configuration (e.g., hardware configuration, software configuration, operating system, etc.) as user device 102.

In some implementations, user device 122 can receive an advertising message. For example, user device 122 can receive the advertising message broadcasted by user device 102, as described above. For example, user device 122 can be configured similarly to user device 102. Schema repository 124 can be configured similarly to schema repository 104. For example, schema repository 124 can store multiple schemas (Schema 'A', 'B' . . . 'N$_{SCH}$') corresponding to state information 126a-126n for Service 1, Service 2, . . . Service N$_{SER}$, as described above with reference to schema repository 104. Schema repository 124 can include a mapping of hash values to advertising message schemas, where the hash values are generated based on service identifiers corresponding to services to be advertised using advertising messages, as described above.

When user device 122 receives the advertising message, advertising message decoder 128 can obtain the schema identifier (e.g., the hash value, or other identifier) from the advertising message header and look up the identified schema in schema repository 124. After obtaining the correct schema based on the schema identifier, decoder 128 can determine the structure of the advertising message based on the structure defined by the obtained schema. For example, decoder 128 can determine that the first ten bits of the advertising message payload are for service 1 data, the second ten bits are for service 2 data, and the last 12 bits are for service 3 data. Decoder 128 can then decode or extract the service advertising data for Service 1 from the first ten bits to generate service 1 state data 126a, decode or extract the service advertising data for Service 2 from the second 10 bits to generate service 2 state data 126b, and decode or extract the service advertising data for Service 3 from the last 12 bits to generate service N state data 126n. After extracting or decoding the data from the advertising message according to the schema, decoder 128 can send the advertised state information (126a, 126b, 126n) to the corresponding services (e.g., service 1, service 2, service 3, etc.) on user device 122 or perform some other operation based on the service data.

While the above description describes user device 102 as the advertising message broadcasting device and user device 122 as the receiving device, each device can perform the operations of broadcaster or receiver. For example, the user device 122 can generate an advertising message based on the schemas, as described above with reference to user device 102. User device 102 can receive an advertising message broadcasting and decoding the advertising message based on the schemas, as described above with reference to user device 122. Thus, user device 102 and user device 122 can be configured to both broadcasting and receiving state advertising messages having adaptable schema based payloads, as described above.

Figure 2:
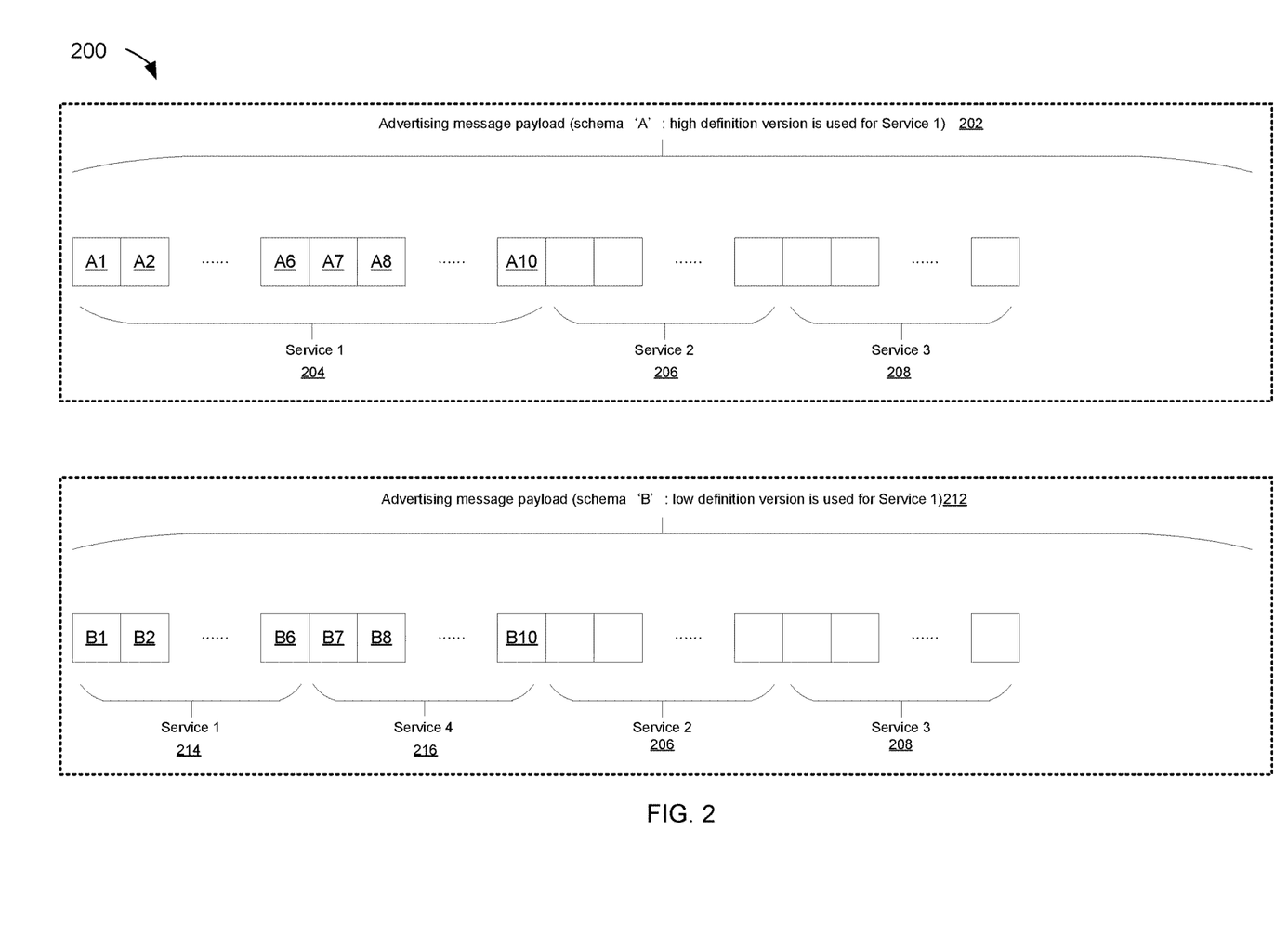
FIG. 2 is an example graph illustrating for high definition and low definition versions of service advertising data.

FIG. 2 is an example graph 200 illustrating for high definition 202 and low definition 212 versions of service advertising data. In some implementations, some service state information can be advertised using high definition 202 or low definition 212 versions of the state data. For example, Service 1 204 on user device 102 may be configured to provide 10 bits of state data to encoder 108. When encoder 108 receives state information from Service 1 (204), Service 2 (206), and Service 3 (208), as described above, the corresponding schema may allow encoder 102 to encode the full (e.g., high definition) 10 bits of data received from Service 1. However, when encoder 108 receives state information from Service 1 (204), Service 2 (206), Service 3 (208) and Service 4 (216), encoder 108 may not have enough bits in the advertising message to encode all 10 bits of data received from Service 1.

In some implementations, message payload encoder 108 can encode a high definition version and/or a low definition version of service state data. For example, all 10 bits of state information delivered to encoder 108 by Service 1 may not be needed or required when broadcasting service state advertisements for Service 1. For example, out of the 10 bits of state data delivered to encoder 108 by Service 1, the first 6 bits may be required data while the last 4 bits may be discretionary or informational data that may be used to enhance the service but are not necessary for providing the service. Thus, a high definition version (e.g. 10 bits) of Service 1 data 204 and a low definition version (e.g., 6 bits) of Service 1 state data 214 may be used in various schema definitions. Thus, when Service 4 data (e.g., 4 bits) is added to service data for Service 1, Service 2, and Service 3, the low definition version (e.g., 6 bits instead of 10 bits) of Service 1 data 214 can be used in the corresponding schema to make room for the 4 bits of Service 4 data 216, as illustrated by advertising message 212. User device 102 can encode the service data received from Services 1, 2, 3 and 4 into advertising message 212 and user device 122 can decode the service data from the advertising message according to the schema defined for Services 1, 2, 3, and 4 as described above. For example, advertising message 202 can include an identifier for a schema providing the high definition version of Service 1 data while advertising message 212 includes an identifier for a different schema providing the low definition version of Service 1 data.

Example Processes

Figure 3:
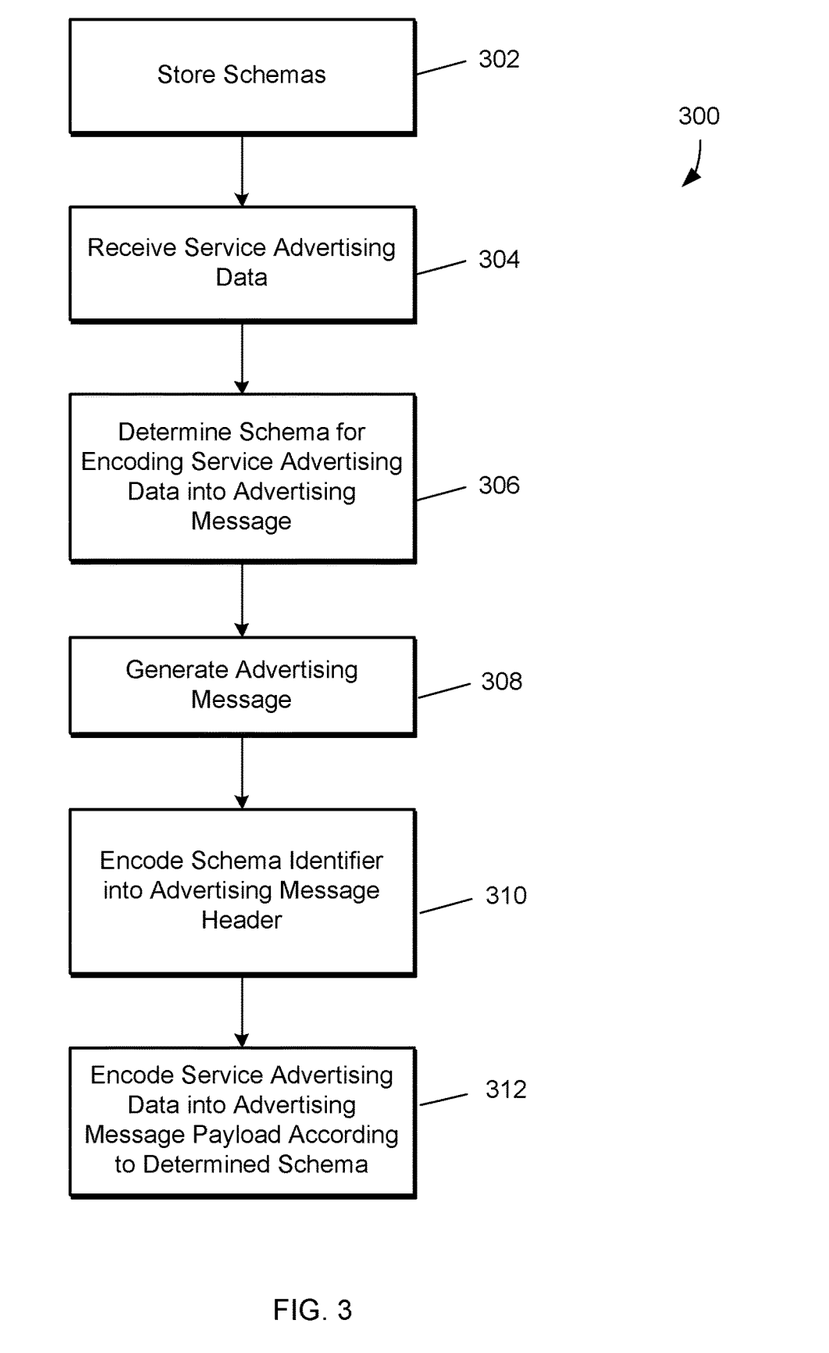
FIG. 3 is flow diagram of an example process 300 for generating an advertising message using adaptable schema based payloads.

FIG. 3 is flow diagram of an example process 300 for generating an advertising message using adaptable schema based payloads. For example, process 300 can be implemented by user device 102 and/or user device 122.

At step 302, user device 102 can store advertising message payload schemas. As described above, the user device 102 can store multiple schemas (Schema 'A', 'B' ... 'N$_{SCH}$') for encoding state information 106a-106n for Service 1, Service 2, ... Service N$_{SER}$. in the schema repository 104. The schemas can be obtained by user device 102 from a network resource (e.g., a server). User device 102 can update the schemas in schema repository 104 periodically (e.g., according to an update interval). User device 102 can update the schemas in schema repository as needed (e.g., when user device 102 received an advertising message that identifies a schema that is not in schema repository 104). For example, state information 106 can correspond to state information for various services (e.g., applications, utilities, daemons, and/or operating system services) running on user device 102. The schemas can define the organization and/or structure of advertising message payloads for encoding service data into advertising message payloads, as described above.

At step 304, user device 102 can receive service advertising data. In some implementations, advertising message encoder 108 can receive state advertising data from various services (e.g., operating system services, user applications, processes, daemons, etc.) on user device 102. These applications can be configured to present media items (e.g., movies, music, videos, etc.) and/or present informative notifications to the user by generating audio, video, and/or haptic representations of data. For example, user device 102 can receive state advertising data from other devices indicating the activity level of the other devices. When user device 102 receives a notification, user device 102 can determine whether to present the notification based on a comparison of the activity level of user device 102 with the activity levels of the other devices. If user device 102 is not the most active device (e.g., the user is using another device), then user device 102 can suppress the notification so that the notification is not presented on user device 102. If the user is using the display of user device 102, the operating system of user device 102 can send display status data (e.g., a bit indicating that the display is lit) to advertising message encoder 108.

At step 306, user device 102 can determine a schema for encoding service advertising data into advertising message. For example, encoder 108 can select a schema based on the received state advertising data and/or which process sent the state advertising data. As described above, schema repository 104 can include multiple different schemas for various combinations of state advertising data. For example, the Schema "A" can be mapped to "services group A" associated with service 1, service 2 and service 3. Schema "B" can be mapped to "service group B" associated with service 1 and service 3. To find the appropriate schema for the advertising processes or services, each schema in schema repository 104 can be mapped to a hash value that can be used as an index for finding or identifying the corresponding schema. In some implementations, the hash value can be generated based on service identifiers. For example, if schema "A" defines the state advertising message structure for advertising state information for service 1 (e.g., service identifier S1), service 2 (e.g., service identifier S2), and service 3 (e.g., service identifier S3), then the service identifiers S1, S2, and S3 can be provided as inputs to a hashing algorithm to generate a hash value to be used as an index for looking up the corresponding Schema A. Thus, when state advertising message encoder 108 receives state information (e.g., including service identifiers) from service 1, service 2 and service 3 (or any other combination of services), encoder 108 can generate a hash value based on the service identifiers in the received state information and use the generated hash value as an index to lookup or determine the appropriate schema (e.g., Schema A) for advertising the service state information in the schema mapping stored in schema repository 104.

At step 308, user device 102 can generate an advertising message. In some implementations, state advertising message encoder 108 can generate a state advertising message based on the determined schema. For example, encoder 108 can encode the schema identifier into the advertising message. For example, the advertising message can be a Bluetooth (e.g., Bluetooth Low Energy) advertising message that includes a header section and payload section as described above. In addition, encoder 108 can encode a schema identifier (e.g., "A", or the corresponding hash value) corresponding to the schema associated with the advertising services into the advertising message (e.g., into the header section), as described above. Encoder 108 can determine the structure of the payload section of the advertising message based on the structure defined by the determined schema. For example, if the payload section includes 32 bits, the schema can define that the first ten bits are for service 1 data, the second ten bits are for service 2 data, and the last 12 bits are for service 3 data. Encoder 108 can then encode the service advertising data for the Service 1, Service 2, and Service 3 into the appropriate bits of the advertising message payload as defined by the determined schema.

At step 310, device 102 can encode the schema identifier into the advertising message header. For example, the advertising message can be a Bluetooth (e.g., Bluetooth Low Energy) advertising message that includes a header section and payload section. In addition, encoder 108 can encode a schema identifier (e.g., "A", or the corresponding hash value) corresponding to the schema associated with the advertising services into the advertising message (e.g., into the header section), as described above.

At step 312, user device 102 can encode the service advertising data into the advertising message payload according to the determined schema. For example, the advertising message payload encoder 108 can encode the service data associate with the services into the advertising message payload data according to the determined schema (e.g., Schema "A"). After encoding the service state information into the advertising message according to the determined schema, user device 102 can broadcast the generated advertising message as described above. For example, user device 102 can broadcast the generated advertising message using a wireless transmitter employing a wireless (e.g., peer-to-peer) technology, such as Bluetooth, Bluetooth Low Energy, peer-to-peer Wi-Fi, or some other wireless technology. The message can be broadcasted without selecting a specific recipient device. For example, user devices (e.g., user device 122) within range of the wireless signal transmitted by user device 102 can receive and/or process the advertising message generated by user device 102.

Figure 4:
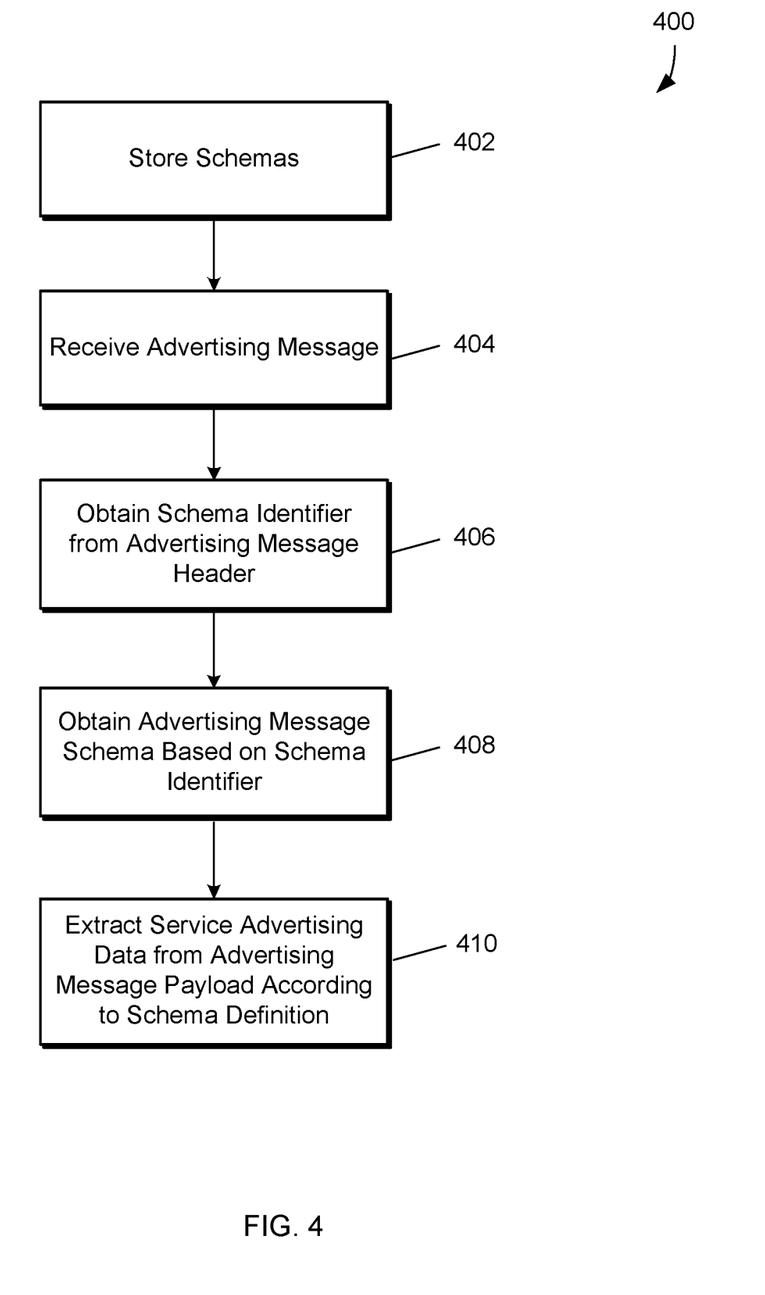
FIG. 4 is flow diagram of an example process 400 for decoding advertising data from an advertising message payload that was encoded using adaptable schema based payloads.

FIG. 4 is flow diagram of an example process 400 for decoding advertising data from an advertising message payload that was encoded using adaptable schema based payloads. For example, process 400 can be implemented by user device 102 and/or user device 122.

At step 402, user device 122 can store multiple schemas. In some implementations, the user device 122 can store multiple schemas (Schema 'A', 'B' . . . '$N_{SCH}$') corresponding to state information 126a-126n for Service 1, Service 2, . . . Service $N_{SER}$. in the schema repository 124. For example, state information 106 can correspond to state information for various services (e.g., applications, utilities, daemons, and/or operating system services) running on user device 102.

At step 404, user device 122 can receive an advertising message. For example, user device 122 can receive the advertising message broadcasted by user device 102, as described above. For example, user device 122 can be configured similarly to user device 102. Schema repository 124 can be configured similarly to schema repository 104. For example, schema repository 124 can store multiple schemas (Schema 'A', 'B' . . . '$N_{SCH}$') corresponding to state information 126a-126n for Service 1, Service 2, . . . Service $N_{SER}$. as described above with reference to schema repository 104. Schema repository 124 can include a mapping of hash values to advertising message schemas, where the hash values are generated based on service identifiers corresponding to services to be advertised using advertising messages, as described above.

At step 406, device 122 can obtain a schema identifier from the advertising message header. For example, when user device 122 receives the advertising message, advertising message decoder 128 can obtain the schema identifier (e.g., the hash value, or other identifier) from the advertising message header.

At step 408, user device 122 can obtain an advertising message schema from schema repository 124 based on the schema identifier. For example, decoder 128 can determine the structure of the advertising message based on the structure defined by the obtained schema. For example, decoder 128 can determine that the first ten bits of the advertising message payload are for service 1 data, the second ten bits are for service 2 data, and the last 12 bits are for service 3 data.

At step 410, user device 122 can extract the advertising message payload data according to the obtained schema. For example, the advertising message payload decoder 128 can extract service advertising data from advertising message payload according to the payload structure definition provided by the obtained schema. Continuing the above example, assuming that the schema defines the structure of the advertising message payload to have the first ten bits of the advertising message payload assigned to service 1 data, the second ten bits assigned to service 2 data, and the last 12 bits assigned to service 3 data, decoder 128 can then decode or extract the service advertising data for service 1 from the first ten bits to generate service 1 state data 126a, decode or extract the service advertising data for Service 2 from the second 10 bits to generate service 2 state data 126b, and decode or extract the service advertising data for Service 3 from the last 12 bits to generate service N state data 126n. After extracting or decoding the data from the advertising message according to the schema, decoder 128 can send the advertised state information (126a, 126b, 126n) to the corresponding services (e.g., service 1, service 2, service 3, etc.) on user device 122.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Example System Architecture

Figure 5:
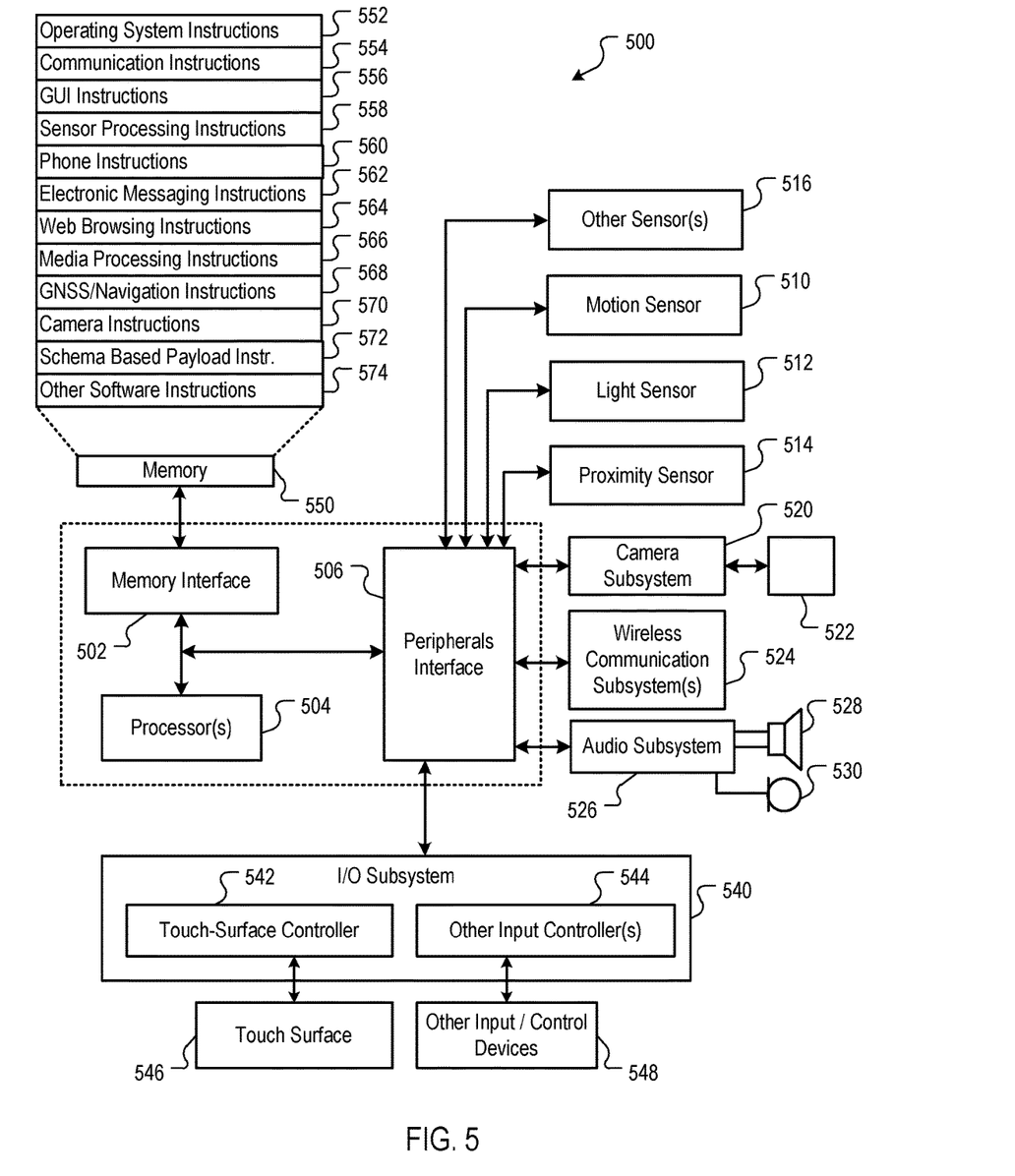
FIG. 5 is a block diagram of an example system architecture implementing the features and processes of FIGS. 1-4.

FIG. 5 is a block diagram of an example computing device 500 that can implement the features and processes of FIGS. 1-4. The computing device 500 can include a memory interface 502, one or more data processors, image processors and/or central processing units 504, and a peripherals interface 506. The memory interface 502, the one or more processors 504 and/or the peripherals interface 506 can be separate components or can be integrated in one or more integrated circuits. The various components in the computing device 500 can be coupled by one or more communication buses or signal lines.

Sensors, devices, and subsystems can be coupled to the peripherals interface 506 to facilitate multiple functionalities. For example, a motion sensor 510, a light sensor 512, and a proximity sensor 514 can be coupled to the peripherals interface 506 to facilitate orientation, lighting, and proximity functions. Other sensors 516 can also be connected to the peripherals interface 506, such as a global navigation satellite system (GNSS) (e.g., GPS receiver), a temperature sensor, a biometric sensor, magnetometer or other sensing device, to facilitate related functionalities.

A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips. The camera subsystem 520 and the optical sensor 522 can be used to collect images of a user to be used during authentication of a user, e.g., by performing facial recognition analysis.

Communication functions can be facilitated through one or more wireless communication subsystems 524, which can include radio frequency receivers and transmitters and/or optical (e.g., infrared) receivers and transmitters. The specific design and implementation of the communication subsystem 524 can depend on the communication network(s) over which the computing device 500 is intended to operate. For example, the computing device 500 can include communication subsystems 524 designed to operate over a GSM network, a GPRS network, an EDGE network, a Wi-Fi or WiMax network, and a Bluetooth™ network. In particular, the wireless communication subsystems 524 can include hosting protocols such that the device 100 can be configured as a base station for other wireless devices.

An audio subsystem 526 can be coupled to a speaker 528 and a microphone 530 to facilitate voice-enabled functions, such as speaker recognition, voice replication, digital recording, and telephony functions. The audio subsystem 526 can be configured to facilitate processing voice commands, voiceprinting and voice authentication, for example.

The I/O subsystem 540 can include a touch-surface controller 542 and/or other input controller(s) 544. The touch-surface controller 542 can be coupled to a touch surface 546. The touch surface 546 and touch-surface controller 542 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 546.

The other input controller(s) 544 can be coupled to other input/control devices 548, such as one or more buttons, rocker switches, thumb-wheel, infrared port, USB port, and/or a pointer device such as a stylus. The one or more buttons (not shown) can include an up/down button for volume control of the speaker 528 and/or the microphone 530.

In one implementation, a pressing of the button for a first duration can disengage a lock of the touch surface 546; and a pressing of the button for a second duration that is longer than the first duration can turn power to the computing device 500 on or off. Pressing the button for a third duration can activate a voice control, or voice command, module that enables the user to speak commands into the microphone 530 to cause the device to execute the spoken command. The user can customize a functionality of one or more of the buttons. The touch surface 546 can, for example, also be used to implement virtual or soft buttons and/or a keyboard.

In some implementations, the computing device 500 can present recorded audio and/or video files, such as MP3, AAC, and MPEG files. In some implementations, the computing device 500 can include the functionality of an MP3 player, such as an iPod™. The computing device 500 can, therefore, include a 36-pin connector that is compatible with the iPod. Other input/output and control devices can also be used.

The memory interface 502 can be coupled to memory 550. The memory 550 can include high-speed random access memory and/or non-volatile memory, such as one or more magnetic disk storage devices, one or more optical storage devices, and/or flash memory (e.g., NAND, NOR). The memory 550 can store an operating system 552, such as Darwin, RTXC, LINUX, UNIX, OS X, WINDOWS, or an embedded operating system such as VxWorks.

The operating system 552 can include instructions for handling basic system services and for performing hardware dependent tasks. In some implementations, the operating system 552 can be a kernel (e.g., UNIX kernel). In some implementations, the operating system 552 can include instructions for performing voice authentication. For example, operating system 552 can implement the adaptable schema based payloads features as described with reference to FIGS. 1-4.

The memory 550 can also store communication instructions 554 to facilitate communicating with one or more additional devices, one or more computers and/or one or more servers. The memory 550 can include graphical user interface instructions 556 to facilitate graphic user interface processing; sensor processing instructions 558 to facilitate sensor-related processing and functions; phone instructions 560 to facilitate phone-related processes and functions; electronic messaging instructions 562 to facilitate electronic-messaging related processes and functions; web browsing instructions 564 to facilitate web browsing-related processes and functions; media processing instructions 566 to facilitate media processing-related processes and functions; GNSS/Navigation instructions 568 to facilitate GNSS and navigation-related processes and instructions; and/or camera instructions 570 to facilitate camera-related processes and functions.

The memory 550 can store other software instructions 572 to facilitate other processes and functions, such as the adaptable schema based payloads processes and functions as described with reference to FIGS. 1-4.

The memory 550 can also store other software instructions 574, such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions of the computing device 500 can be implemented in hardware and/or in software, including in one or more signal processing and/or application specific integrated circuits.

What is claimed is:

1. A method comprising:
   storing, by a second user device, a plurality of schemas, each of the plurality of schemas defining a structure for encoding service state data into state advertising messages, the plurality of schemas including a first schema defining a structure for encoding state data received from a first combination of services into state advertising messages and a second schema defining a structure for encoding state data received from a second combination of services into state advertising messages, wherein the structure for state advertising messages can be dynamically redefined based on the plurality of schemas stored on the device and without reconfiguring the device;
   selecting, by the second user device, the first schema from the plurality of schemas for encoding the first state data and the second state data into a state advertising message, the first schema having a first schema identifier;
   receiving, by the first user device, the state advertising message broadcast by a second user device;
   obtaining, by the first user device, the first schema identifier from the state advertising message;
   based on the schema identifier, obtaining, by the first user device, the first schema that defines the structure of the state advertising message;
   decoding, by the first user device, the first state data corresponding to a first service on the first user device;
   sending, by the first user device, the first state data to the first service;
   decoding, by the first user device, the second state data corresponding to a second service on the first user device; and
   sending, by the first user device, the second state data to the second service.

2. The method of claim 1, further comprising:
   storing, by the first user device, a plurality of state advertising schemas in a schema repository.

3. The method of claim 1, wherein the state advertising message is a Bluetooth advertising packet having a header section and a payload section, and further comprising:
   obtaining the first schema identifier from the header section of the Bluetooth advertising packet;
   decoding, by the user device, the first state data and the second state data from the payload section of the Bluetooth advertising packet according to the schema.

4. The method of claim 1, further comprising:
   determining that the schema corresponds to a low definition version of the first state data; and
   decoding the low definition version of the first state data from the state advertising message when the first schema corresponds to the low definition version of the first state data, where the low definition version of the first state data corresponds to less than a complete representation of the first state data.

5. The method of claim 1, further comprising:
   determining that the schema corresponds to a high definition version of the first state data; and
   decoding the high definition version of the first state data from the state advertising message when the first schema corresponds to the high definition version of the first state data, where the high definition version of the first state data corresponds to a complete representation of the first state data.

6. A system comprising:
   one or more processors; and
   a non-transitory computer-readable medium including one or more sequences of instructions that, when executed by the one or more processors, causes:
   storing, by a second user device, a plurality of schemas, each of the plurality of schemas defining a structure for encoding service state data into state advertising messages, the plurality of schemas including a first schema defining a structure for encoding state data received from a first combination of services into state advertising messages and a second schema defining a structure for encoding state data received from a second combination of services into state advertising messages, wherein the structure for state advertising messages can be dynamically redefined based on the plurality of schemas stored on the device and without reconfiguring the device;
   selecting, by the second user device, the first schema from the plurality of schemas for encoding the first state data and the second state data into a state advertising message, the first schema having a first schema identifier;
   receiving, by the first user device, the state advertising message broadcast by a second user device;
   obtaining, by the first user device, the first schema identifier from the state advertising message;
   based on the schema identifier, obtaining, by the first user device, the first schema that defines the structure of the state advertising message;
   decoding, by the first user device, the first state data corresponding to a first service on the first user device;
   sending, by the first user device, the first state data to the first service;
   decoding, by the first user device, the second state data corresponding to a second service on the first user device; and
   sending, by the first user device, the second state data to the second service.

7. The system of claim 6, wherein the instructions cause:
   storing, by the first user device, a plurality of state advertising schemas in a schema repository.

8. The system of claim 6, wherein the state advertising message is a Bluetooth advertising packet having a header section and a payload section, and wherein the instructions cause:
   obtaining the first schema identifier from the header section of the Bluetooth advertising packet;
   decoding, by the user device, the first state data and the second state data from the payload section of the Bluetooth advertising packet according to the schema.

9. The system of claim 6, wherein the instructions cause:
   determining that the schema corresponds to a low definition version of the first state data; and decoding the low definition version of the first state data from the state advertising message when the first schema corresponds to the low definition version of the first state data, where the low definition version of the first state data corresponds to less than a complete representation of the first state data.

10. The system of claim 6, wherein the instructions cause:
determining that the schema corresponds to a high definition version of the first state data; and
decoding the high definition version of the first state data from the state advertising message when the first schema corresponds to the high definition version of the first state data, where the high definition version of the first state data corresponds to a complete representation of the first state data.

11. A non-transitory computer-readable medium including one or more sequences of instructions that, when executed by the one or more processors, causes:
storing, by a second user device, a plurality of schemas, each of the plurality of schemas defining a structure for encoding service state data into state advertising messages, the plurality of schemas including a first schema defining a structure for encoding state data received from a first combination of services into state advertising messages and a second schema defining a structure for encoding state data received from a second combination of services into state advertising messages, wherein the structure for state advertising messages can be dynamically redefined based on the plurality of schemas stored on the device and without reconfiguring the device;
selecting, by the second user device, the first schema from the plurality of schemas for encoding the first state data and the second state data into a state advertising message, the first schema having a first schema identifier;
receiving, by the first user device, the state advertising message broadcast by a second user device;
obtaining, by the first user device, the first schema identifier from the state advertising message;
based on the schema identifier, obtaining, by the first user device, the first schema that defines the structure of the state advertising message;
decoding, by the first user device, the first state data corresponding to a first service on the first user device;
sending, by the first user device, the first state data to the first service;
decoding, by the first user device, the second state data corresponding to a second service on the first user device; and
sending, by the first user device, the second state data to the second service.

12. The non-transitory computer-readable medium of claim 11, wherein the instructions cause:
storing, by the first user device, a plurality of state advertising schemas in a schema repository.

13. The non-transitory computer-readable medium of claim 11, wherein the state advertising message is a Bluetooth advertising packet having a header section and a payload section, and wherein the instructions cause:
obtaining the first schema identifier from the header section of the Bluetooth advertising packet;
decoding, by the user device, the first state data and the second state data from the payload section of the Bluetooth advertising packet according to the schema.

14. The non-transitory computer-readable medium of claim 11, wherein the instructions cause:
determining that the schema corresponds to a low definition version of the first state data; and
decoding the low definition version of the first state data from the state advertising message when the first schema corresponds to the low definition version of the first state data, where the low definition version of the first state data corresponds to less than a complete representation of the first state data.

15. The non-transitory computer-readable medium of claim 11, wherein the instructions cause:
determining that the schema corresponds to a high definition version of the first state data; and
decoding the high definition version of the first state data from the state advertising message when the first schema corresponds to the high definition version of the first state data, where the high definition version of the first state data corresponds to a complete representation of the first state data.

* * * * *